United States Patent [19]

Fuchs et al.

[11] 4,145,339
[45] Mar. 20, 1979

[54] WATER-SOLUBLE 1:2-COBALT COMPLEX DYESTUFFS OF AN AZOMETHINE AND OF AN AZO COMPOUND

[75] Inventors: Hermann Fuchs, Kelkheim; Klaus Filzinger, Hofheim, both of Fed. Rep. of Germany

[73] Assignee: Hoechst Aktiengesellschaft, Frankfurt am Main, Fed. Rep. of Germany

[21] Appl. No.: 860,108

[22] Filed: Dec. 13, 1977

Related U.S. Application Data

[63] Continuation of Ser. No. 764,996, Feb. 2, 1977, abandoned.

[30] Foreign Application Priority Data

Apr. 24, 1976 [DE] Fed. Rep. of Germany ....... 2618020

[51] Int. Cl.² .................. C09B 45/20; C09B 45/30; C09B 62/74; D06P 3/24
[52] U.S. Cl. .................. 260/148; 260/149; 260/176; 260/193; 260/439 CY; 260/509
[58] Field of Search .................. 260/145 A, 148, 149

[56] References Cited

U.S. PATENT DOCUMENTS

| 2,855,393 | 10/1958 | Schetty et al. ............ 260/145 |
| 3,391,132 | 7/1968 | Beffa et al. ............ 260/145 |
| 3,978,037 | 8/1976 | Beffa et al. ............ 260/151 |

FOREIGN PATENT DOCUMENTS 2520526  11/1975  Fed. Rep. of Germany ...... 260/145 A

*Primary Examiner*—Floyd D. Higel
*Attorney, Agent, or Firm*—Curtis, Morris & Safford

[57] ABSTRACT

Novel, valuable unsymmetrical 1:2-cobalt complex dyestuffs of an azo compound and an azomethine compound have been found which are well suited for the dyeing of natural and synthetic polyamide fibres, yielding even dyeings of high fastnesses to wet processing and use as well as to light. The novel dyestuffs can be prepared either by cobalting the equimolar mixture of the metalfree azo and azomethine dyestuffs with a cobalt-yielding compound at a pH of 5 to 10 at 60° to 150° C., or by first cobalting the azomethine compound and then reacting it with the equimolar amount of the metal-free azo compound. The compounds are 1:2-cobalt complex compounds of the compounds

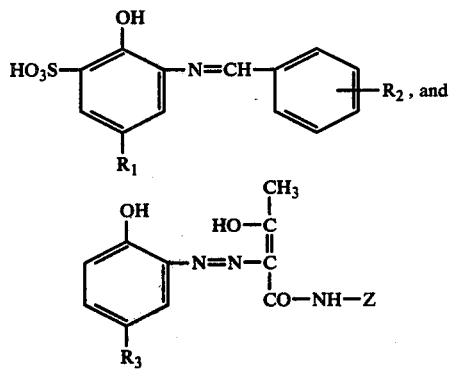

in which $R_1$ is chlorine, lower alkyl or nitro,
$R_2$ is hydrogen, lower alkyl or lower alkoxy,
$R_3$ is hydrogen, chlorine, nitro or lower alkyl,
Z is

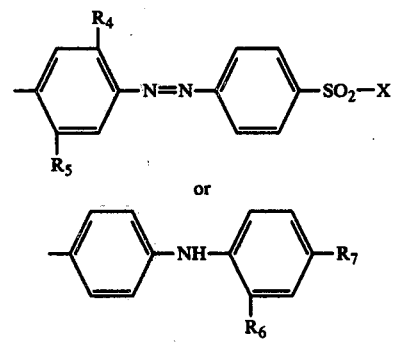

in which
$R_4$ is hydrogen, lower alkyl or lowr alkoxy,
$R_5$ is hydrogen, lower alkyl or lower alkoxy,
X is hydroxy, sulfoalkyl of from 1 to 4 carbon atoms, or

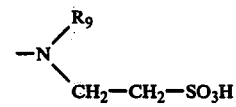

$R_9$ is hydrogen or lower alkyl, and
$R_6$ and $R_7$ are different from each other and each is nitro or sulfo.

4 Claims, No Drawings

WATER-SOLUBLE 1:2-COBALT COMPLEX DYESTUFFS OF AN AZOMETHINE AND OF AN AZO COMPOUND

This is a continuation of application Ser. No. 764,996, filed Feb. 2, 1977, now abandoned.

This invention relates to novel and valuable unsymmetrical 1:2-cobalt complex compounds, to their preparation and their use as dyestuffs for dyeing natural and synthetic polyamide fibers.

It is an object of the present invention to provide unsymmetrical 1:2-cobalt complex compounds each containing as dyestuff components an azomethine compound of the formula (1) and a monoazo compound of the formula (2), and mixtures of said unsymmetrical 1:2-cobalt complex compound with the symmetrical 1:2-cobalt complex compounds of these compounds (1) and (2)

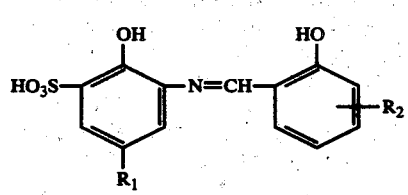

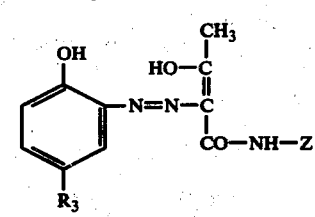

in which $R_1$ represents a chlorine atom, a lower alkyl group, for example the methyl or ethyl group, preferably the methyl group, or the nitro group, $R_2$ represents a hydrogen atom, a lower alkyl group, for example the methyl or ethyl group, preferably the methyl group, or a lower alkoxy group, for example the methoxy or ethoxy group, preferably the methoxy group, $R_3$ represents a hydrogen atom, a chlorine atom, a nitro group, or a lower alkyl group, for example the methyl or ethyl group, preferably the methyl group and Z stands for a radical of the formula (3)

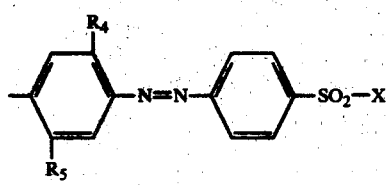

or of the formula (4)

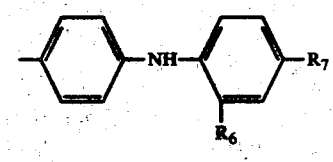

in which latter formulae $R_4$ represents a hydrogen atom, a lower alkyl or a lower alkoxy group, for example the methyl, ethyl, methoxy or ethoxy group, preferably the methyl or methoxy group, $R_5$ represents a hydrogen atom, a lower alkyl or a lower alkoxy group, preferably hydrogen or the methyl, methoxy or ethoxy group, X stands for the hydroxy group, a sulfoalkyl group having from 1 to 4 carbon atoms, for example the β-sulfo-ethyl group, or the group of the formula

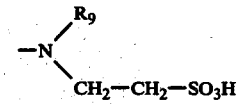

in which $R_9$ represents a hydrogen atom or a lower alkyl group, for example the methyl group, and $R_6$ and $R_7$ which are different from each other each represents a nitro or a sulfo group.

The novel dyestuffs are preferably used in the form of their alkali metal or alkaline earth metal salts, for example as the sodium, potassium or calcium salt, or as the ammonium salt. The unsymmetrical dyestuffs are preferred.

In accordance with the invention, the novel 1:2-cobalt complex dyestuffs are prepared by metallizing the metal-free starting compounds of formulae (1) and (2) in a molar proportion of 1:1 at a temperature of from 60° to 145° C., i.e., at atmospheric pressure at about 60° to 100°–105° C. and under elevated pressure at about 105° to 145° C., at a pH in the range of from 5.0 to 10, preferably from 8.0 to 9.5, whereby the novel 1:2-cobalt complex dyestuffs are obtained. The metallization is preferably carried out in an aqueous medium.

According to a preferred embodiment, the azomethine compound of formula (1) is first reacted with a cobalt-yielding compound, for example in aqueous solution at a pH of from 7 to 10, preferably 8.5 to 9.5, at a temperature of from 20° to 70° C., preferably 50° to 60° C., and the resulting compound is then reacted with the compound of formula (2) at a pH of from 7 to 10, preferably 8.5 to 9.5, at a temperature of from 60° to 130° C., preferably 80° to 105° C.

Suitable cobalting agents are cobalt salts of inorganic or organic acids, for example cobalt carbonate, cobalt hydroxy-carbonate, cobalt acetate and cobalt sulfate.

The metallization can be carried out in the presence of an acid-binding agent, such as salt, oxide or hydroxide of an alkali metal or alkaline earth metal, or of an alkaline earth metal and alkali metal salt having an alkaline reaction, for example sodium or potassium acetate, sodium or potassium carbonate or bicarbonate, sodium or potassium hydroxide, calcium carbonate, or calcium oxide.

The cobalt complex dyestuffs obtained in this manner can be isolated from their solutions of preparation by salting out with sodium or potassium chloride or by spray-drying.

A further embodiment of this invention is, to use the novel dyestuffs to dye natural and synthetic polyamide fibers, for example wool, silk, and synthetic polyamides, such as made from ε-caprolactam, from hexamethylene diamine and adipic acid or from ω-amino-undecylic acid. They are especially suited for dyeing the aforesaid fiber types in admixture with other hydrophobic fibers, for example wool in a mixture of wool with polyester fibers, with excellent resistibility of the hydrophobic fibers.

The dyestuffs are used for dyeing preferably in the form of their alkali metal salts, for example the sodium, potassium or ammonium salts. Alternatively, they can be used in admixture with other 1:2-cobalt- or -chromium complex dyes containing one or two sulphonic acid groups per dyestuff molecule. Dyeing is performed in known manner under conditions usual for metal complex dyes. The material is preferably dyed in an acid or neutral bath, advantageously at a pH of from 4.0 to 6.5 and at a temperature in the range of from 90° to 105° C. with the addition of the usual dyeing auxiliaries, such as fatty amine or fatty alcohol oxethylation products, and usual buffer substances, for example sodium phosphate, sodium acetate, sodium formate, optionally in admixture with the corresponding acids to stabilize the pH of the dyeing bath. By adding an acid, for example formic acid or acetic acid or even a mineral acid, to the dyeing bath containing an alkali metal salt of formic acid, acetic acid or of another organic acid, the pH of the dyeing bath can be optimized with regard to the dyestuff concentration used and to the desired depth of (color) shade.

For local dyeing by printing, pastes are used containing the usual thickeners and printing auxiliaries and a salt of a weak base and a strong mineral acid or an organic acid, for example ammonium sulfate or ammonium tartrate. The printed fabrics are dried and treated with hot air or steam for a short period of time.

The novel dyestuffs yield thus on natural and synthetic polyamide fibers yellow, golden yellow or yellow brown shades having a good to very good fastness to wet processing, for example a fastness to washing at 20° to 60° C., (for example, 40° and 60° C. according to DIN 54010 and 54014), fastness to water (under severe conditions) and fastness to alkaline and acid perspiration, a good fastness to decatizing and an excellent fastness to light under the xenotest and daylight lamps.

The starting compounds of formula (1) (azomethine compounds) are obtained by condensing an amine of the formula (5)

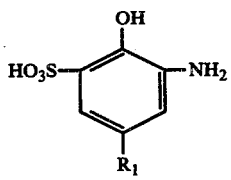 (5)

in which $R_1$ has the aforesaid meaning with an aldehyde of the formula (6)

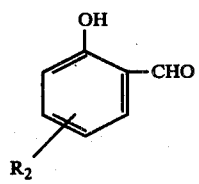 (6)

in which $R_2$ has the aforesaid meaning, preferably in aqueous solution, at a temperature in the range of from 20° to 80° C., preferably 50° to 60° C., and at a pH of from 8.0 to 9.5, preferably 8.5 to 9.0.

The starting compounds of formula (2) are obtained by coupling an amine, which has been diazotized in known manner and corresponds to the formula (7)

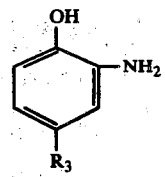 (7)

in which $R_3$ has the aforesaid meaning, with a coupling component of the formula (8)

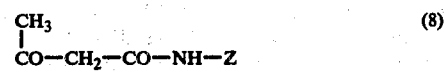 (8)

in which Z has the aforesaid meaning, under the usual known coupling conditions, for example at a temperature of from $-5°$ C. to $+40°$ C. and at a pH of from 6 to 10, preferably 7 to 8.

The starting compounds of formula (8) used for the above reaction in which Z represents a radical of formula (4) above, i.e., 2-nitro-4'-N-acetoacetylamino-diphenylamino-2-sulfonic acid or 4-nitro-4'-N-acetoacetylamino-diphenylamino-2-sulfonic acid, or the starting compounds of formula (8) in which Z represents a radical of formula (3), are obtained by reacting a compound of the formula (9)

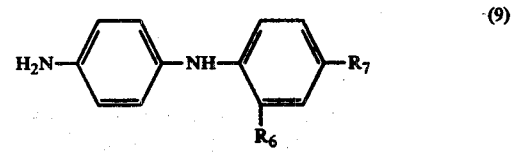 (9)

or of the formula (10)

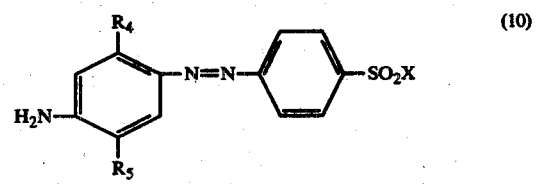 (10)

in which $R_4$, $R_5$, $R_6$, $R_7$ and X have the aforesaid meaning, with diketene, advantageously in aqueous solution, at a temperature of from 20° to 90° C., preferably 50° to 60° C., and at a pH of from 3 to 9, preferably 5 to 6.

The following examples illustrate the invention; the parts are parts by weight, and the percentages are percent by weight.

EXAMPLE 1

22.4 Parts of 4-chloro-2-aminophenol-6-sulfonic acid were dissolved in 100 parts of water with the addition of 12.5 parts of an aqueous 33% sodium hydroxide solution. 12.2 Parts of 2-hydroxy-benzaldehyde in 200 parts of water and 34 parts of an aqueous 33% sodium hydroxide solution were then added, and the reaction mixture was heated to 60° C. A pH of 9.2 was adjusted with glacial acetic acid, the mixture was stirred for 1 to 2 hours at 60° C. and the pH was again adjusted to a value of 9.2. Next, the reaction mixture was cooled to 25° C. and 12.5 g of cobalt hydroxy-carbonate were added.

Stirring was continued for 30 minutes, whereupon the solution of the second azo compound, prepared as follows, was added.

30.9 Parts of 2-nitro-4'-aminodiphenylamino-4-sulfonic acid were dissolved at 50° to 60° C. at a pH of from 6 to 7 in 100 parts of water and 12.1 parts of an aqueous 33% sodium hydroxide solution. 10.1 Parts of diketene were added dropwise over a period of 30 minutes and stirring of the reaction mixture was continued for another 2 hours at 50° to 60° C., whereupon the mixture was cooled to 20° C. In a separate vessel, 15.4 parts of 4-nitro-2-aminophenol were dissolved in 150 parts of water and 25 parts of an aqueous 31% hydrochloric acid, 50 parts of ice were added and the aminophenol was diazotized by adding dropwise 17.3 parts of an aqueous 40% sodium nitrite solution. Stirring was continued for another 30 minutes and the excess of nitrous acid was decomposed by adding approximately 0.5 parts of amidosulfonic acid. The afore-described solution of the acetoacetyl coupling component was then added to the diazo solution obtained, a pH of 8.5 to 9.0 was adjusted with sodium carbonate and coupling was completed at 20° C. while stirring for 4 hours.

The solution of the metal-free azo compound prepared in this manner was combined with the above solution of the cobalt complex-azomethine compound, and the reaction mixture was heated for 4 to 6 hours at 95° C. The 1:2-cobalt complex compound formed was precipitated by salting out with sodium chloride or isolated by spray-drying. In the form of the free acid the dyestuff had the following formula

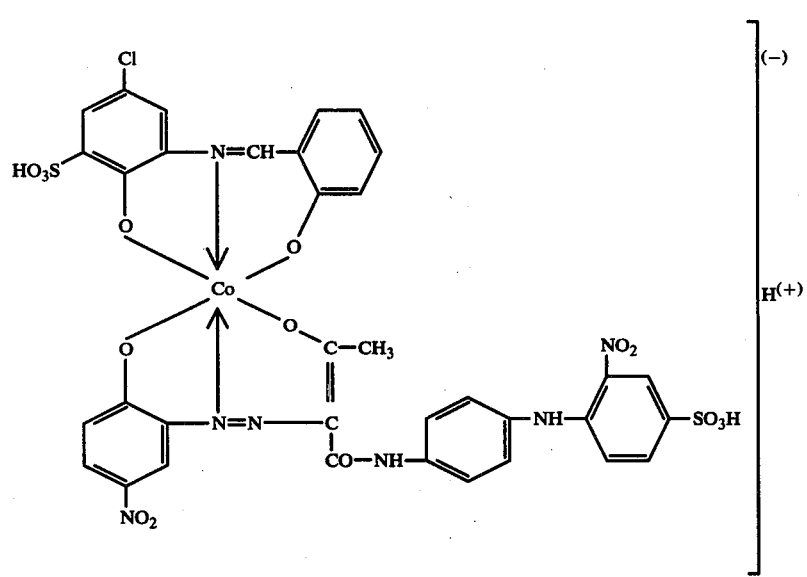

DYEING EXAMPLE

100 Parts of a woolen fabric were introduced into a dyeing bath of 40° C., containing 1.0 part of the cobalt complex dye of Example 1, 0.15 parts of an addition product of 12 mols of ethylene oxide on 1 mol of stearyl amine, 2 parts of ammonium acetate and 2 parts of 60% acetic acid in 3,000 parts of water. The temperature of the dyeing bath was increased within 30 minutes to boil and dyeing was continued for 60 minutes at 100° C. The fabric was then after-treated in usual manner. A golden yellow coloration of good uniformity was obtained having a good to very good fastness to wet processing and an excellent fastness to light.

When, instead of the woolen fabric, 100 parts of a fabric of polycaprolactam fibers were dyed, a dyeing was obtained which also had good to very good fastnesses to use and processing and an excellent fastness to light.

EXAMPLE 2

In the preparation of the azo compound according to Example 1 the 4-nitro-2-aminophenol was replaced by 14.4 parts of 4-chloro-2-aminophenol. With the other conditions remaining the same, a 1:2-cobalt complex dye was obtained having the following formula in the form of the free acid.

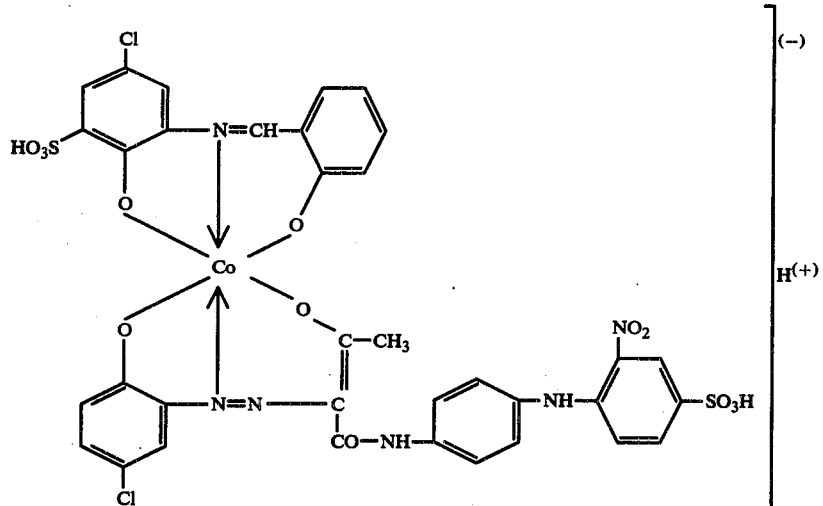

DYEING EXAMPLE

100 Parts of a fabric of polycaprolactam fibers were introduced into a bath of 40° C. containing 1.5 parts of the cobalt complex dye of EXAMPLE 2, 0.15 parts of an addition product of 12 mols of ethylene oxide on 1 mol of stearyl amine, 2.0 parts of ammonium acetate and 2.0 parts of an aqueous 60% acetic acid in 3,000 parts of water. The temperature of the dyeing bath was raised to 98° to 100° C. within 15 minutes and the fabric was dyed for 60 minutes at 100° C. After the usual completion, a golden yellow dyeing was obtained having good to very good fastnesses to wet processing and an excellent fastness to light.

When the fabric of polycaprolactam fibers was replaced by 100 parts of wool, the dyeing obtained had likewise good to very good fastnesses to use and processing and an excellent fastness to light.

EXAMPLE 3

22.4 Parts of 4-chloro-2-aminophenol-6-sulfonic acid were dissolved in 100 parts of water with the addition of 12.5 parts of an aqueous 33% sodium hydroxide solution. 12.2 parts of 2-hydroxy-benzaldehyde in 200 parts of water and 34 parts of an aqueous 33% sodium hydroxide solution were then added and the reaction mixture was heated to 60° C. A pH of 9.2 was adjusted with glacial acetic acid and the mixture was stirred for another 1 to 2 hours at 60° C. at a pH of 9.2. Next, the mixture was cooled to 25° C., and 12.5 parts of cobalt hydroxy-carbonate were added. After 30 minutes, a solution of a disazo compound, prepared as follows, was added.

27.7 Parts of 4-amino-azobenzene-4'-sulfonic acid were dissolved in 200 parts of water and 12.1 parts of an aqueous 33% sodium hydroxide solution at a pH of 6 to 7 and a temperature of 50° to 60° C. 10.1 Parts of diketene were then added dropwise over a period of 30 minutes and the reaction mixture was stirred for 2 hours at 50° to 60° C., whereupon it was cooled to 20° C. In a separate vessel, 15.4 parts of 4-nitro-2-aminophenol were dissolved in 150 parts of water and 25 parts of 31% hydrochloric acid, 50 parts of ice were added and the phenol was diazotized by slowly adding 17.3 parts of an aqueous 40% sodium nitrite solution. After 30 minutes, about 0.5 parts of amidosulfonic acid were added to decompose the excess nitrous acid. Next, the solution of the acetoacetyl compound described above was added to the diazo solution obtained, the pH was adjusted to 8.5 to 9.0 by adding sodium carbonate and coupling was completed at room temperature while stirring for 4 hours.

The solution of the disazo compound obtained was combined with the solution of the cobalt complex azomethine compound described above, and the reaction mixture was heated at 95° C. for 4 to 6 hours. The 1:2-cobalt complex dye obtained was precipitated by salting out with sodium chloride or isolated by spray drying. In the form of the free acid it has the formula

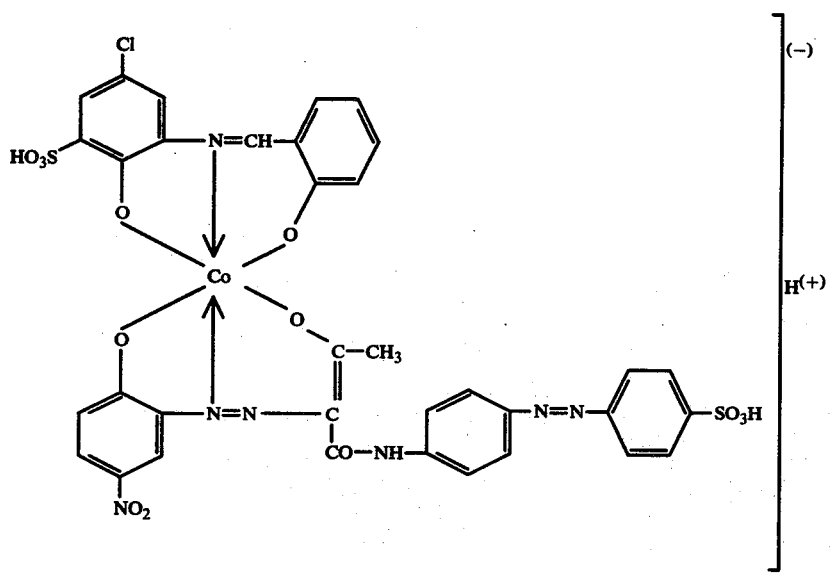

DYEING EXAMPLE

Polyamide carpet yarn was padded with an aqueous padding liquor containing 10 parts of the dyestuff of Example 3, 5 parts of a locust bean flour preparation, 4 parts of an addition product of 8 mols of ethylene oxide on 1 mol of isotridecyl alcohol and 10 parts of an aqueous 60% acetic acid in 1,000 parts of the padding liquor, to a liquor pickup of 100%; the yarn was steamed for 6 minutes at 100° to 102° C. and then rinsed with cold water. The golden yellow dyeing obtained had good fastnesses to use and an excellent fastness to daylight.

EXAMPLE 4

In the preparation of the disazo according to Example 3 the 4-amino-azobenzene-4'-sulfonic acid was replaced by 41.3 parts of 4-amino-6-methyl-3-methoxy-azobenzene-4'-β-sulfoethyl-sulfone, the other conditions remaining the same. The 1:2-cobalt complex compound obtained had the following formula in the form of the free acid.

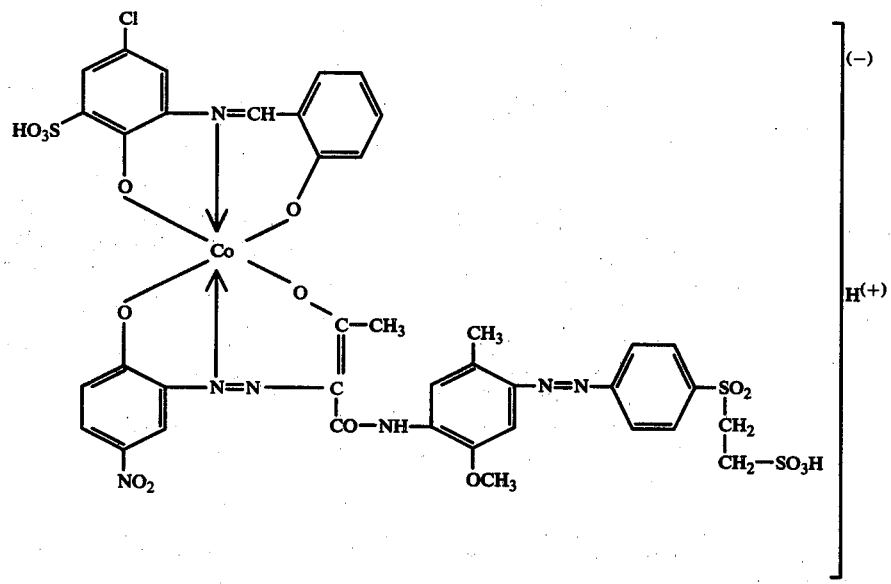

DYEING EXAMPLE

100 Parts of wool flock were introduced into a dyeing bath of 40° C., containing 1.0 part of the cobalt complex dye of Example 4, 0.15 parts of an addition product of 12 mols of ethylene oxide on 1 mol of stearyl amine, 2 parts of ammonium acetate and 2 parts of an aqueous 60% acetic acid in 3,000 parts of water. The temperature of the dye bath was raised to boiling within 30 minutes, and dyeing was continued for 60 minutes at 100° C.

After the usual after-treatment and completion, an even golden yellow dyeing was obtained having good to very good fastnesses to wet processing and an excellent fastness to light.

When, instead of 100 parts of wool flock, the same amount of woolen yarn in hanks was dyed, a very good and even dyeing having good to very good fastnesses to wet processing and an excellent fastness to light was likewise obtained.
In the following table are listed further dyestuffs according to the invention which were prepared under the conditions specified in the preceding examples. They yielded golden yellow dyeings on wool.
EXAMPLE
DYESTUFF
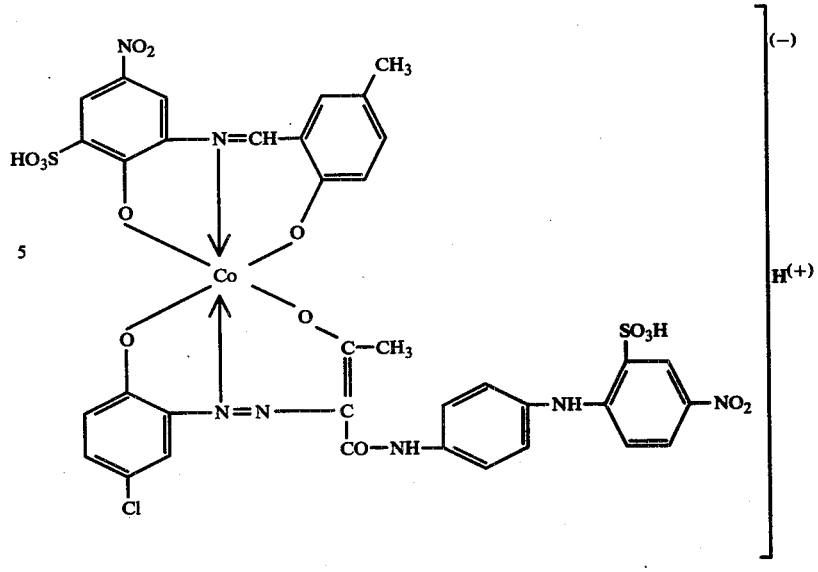
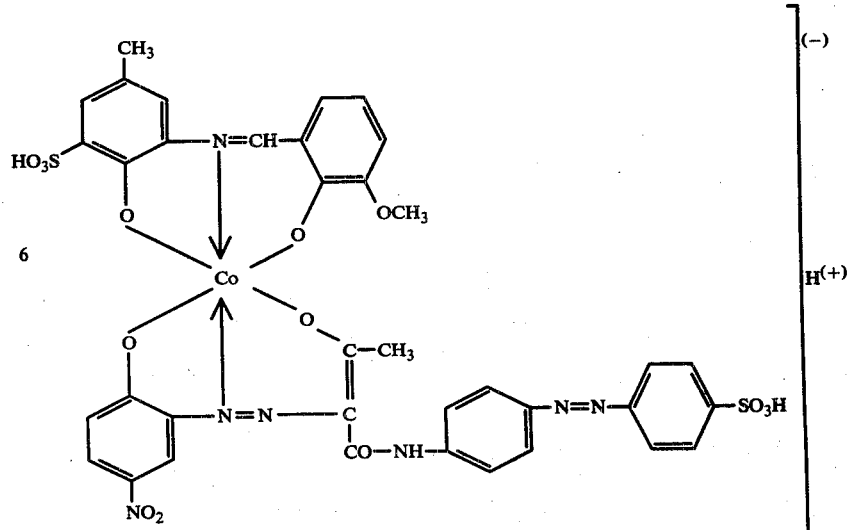

-continued
DYESTUFF
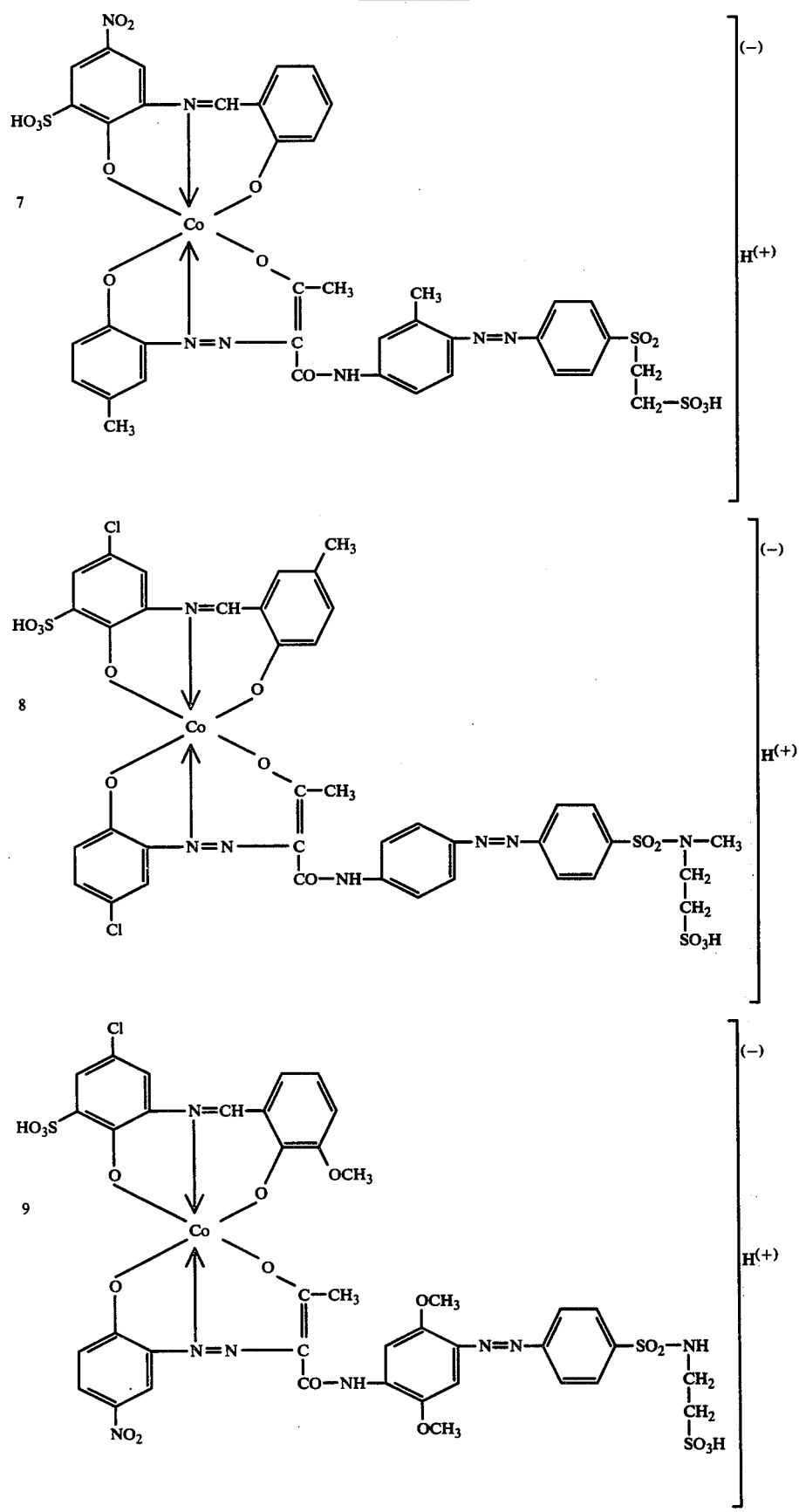

-continued
DYESTUFF
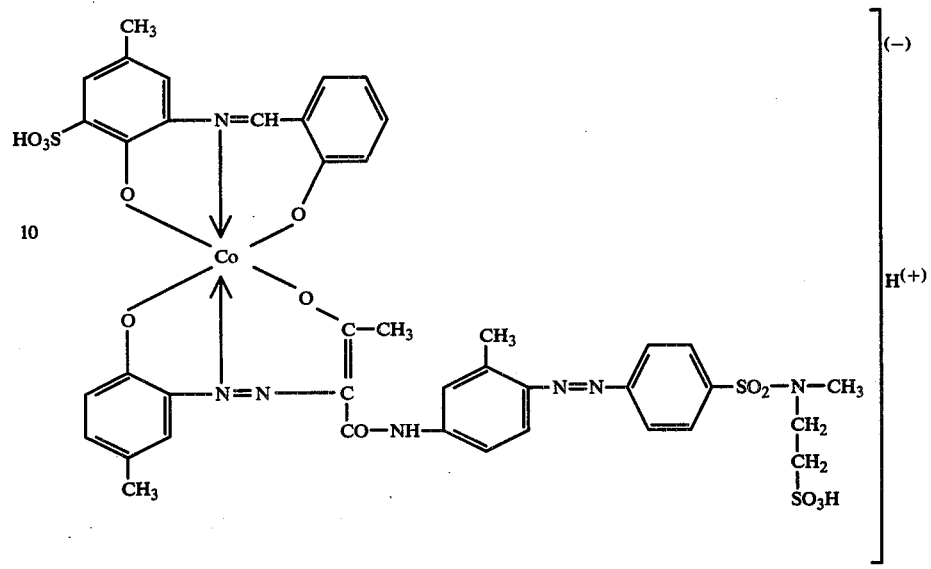
10
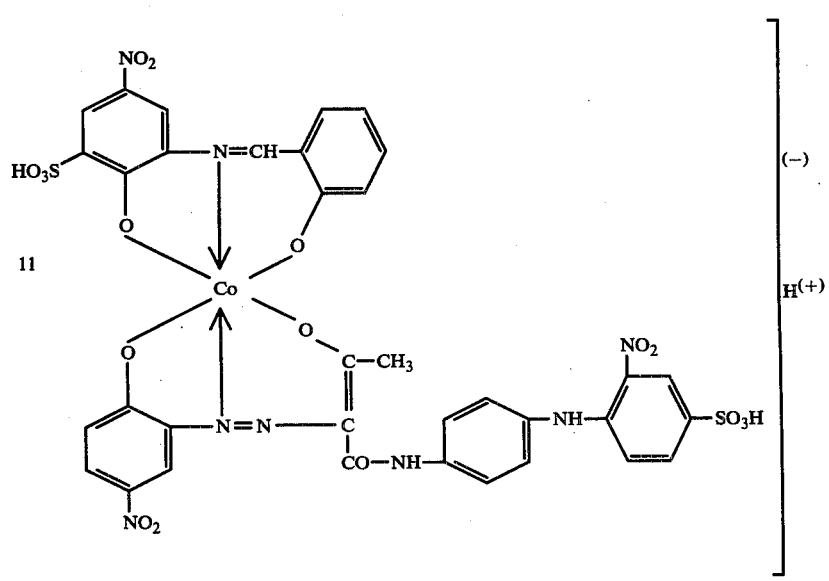
11

-continued

DYESTUFF

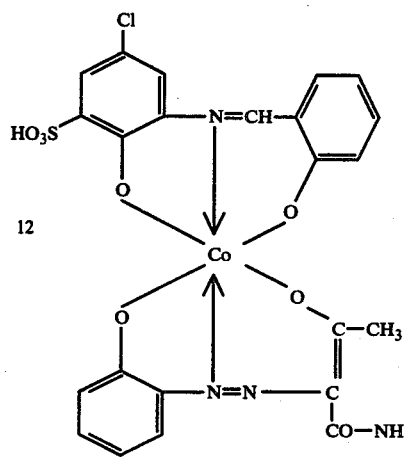

12

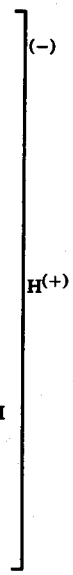

EXAMPLE 13

32.8 Parts of the azomethine dyestuff prepared under the conditions of Example 1 and 55.8 parts of the azo dyestuff prepared according to Example 1 were mixed in the form of the solution or suspension obtained, 12.5 parts of cobalt hydroxy-carbonate were added and the whole was stirred for 30 minutes at 20° to 30° C., heated to boil and then refluxed for 4 to 6 hours. After the usual precipitation with sodium chloride or by spray drying, a dye was obtained containing, besides the 1:2-cobalt complex dyestuff of the azomethine dyestuff and the 1:2-cobalt complex dyestuff of the azo compound, the unsymmetrical 1:2-cobalt complex dyestuff defined in Example 1 by the formula of the free acid as main component. It had the same tinctorial properties as the dyestuff of Example 1.

EXAMPLE 14

32.8 Parts of the azomethine dyestuff according to Example 3 and 52.6 parts of a disazo dyestuff according to Example 3 were mixed in the form of the solution or suspension obtained. 12.5 Parts of cobalt hydroxy-carbonate were added, the whole was stirred for 30 minutes at 20° to 30° C. and then heated to boil. The reaction mixture was then refluxed for 4 to 6 hours. The dyestuff obtained contained as the main component the unsymmetrical 1:2-cobalt complex dyestuff defined by the formula of Example 3, besides the 1:2-cobalt complex dyestuff of the azomethine compound and the 1:2-cobalt complex dyestuff of the disazo compound. It had the same good tinctorial properties as the unsymmetrical 1:2-cobalt complex dyestuff of Example 3.

We claim:

1. A 1:2-cobalt complex compound of the compounds

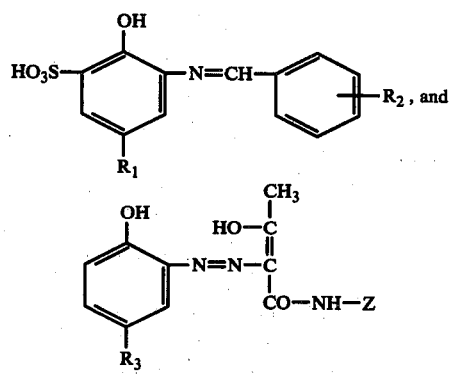

in which
$R_1$ is chlorine, lower alkyl or nitro,
$R_2$ is hydrogen, lower alkyl or lower alkoxy,
$R_3$ is hydrogen, chlorine, nitro or lower alkyl,
Z is

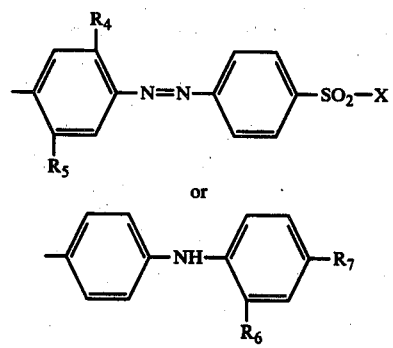

in which
$R_4$ is hydrogen, lower alkyl or lower alkoxy,
$R_5$ is hydrogen, lower alkyl or lower alkoxy,
X is hydroxy, sulfoalkyl of from 1 to 4 carbon atoms, or

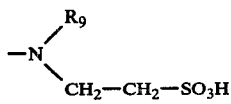
in which
R_9 is hydrogen or lower alkyl, and
R_6 and R_7 are different from each other and each is nitro or sulfo.
2. The 1:2-cobalt complex compound according to claim 1 of the formula
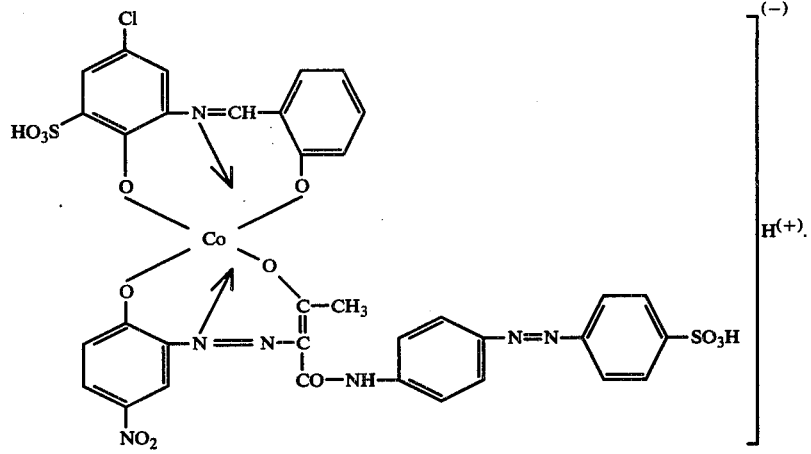
3. The 1:2-cobalt complex compound according to claim 1 of the formula
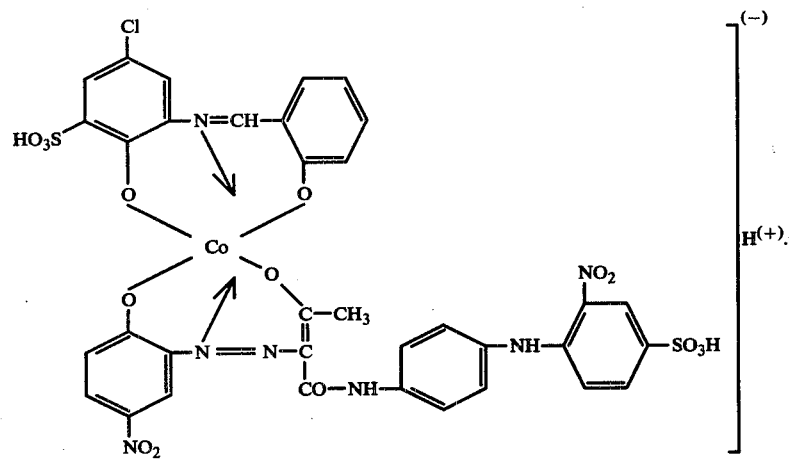
4. The 1:2-cobalt complex compound according to claim 1 of the formula
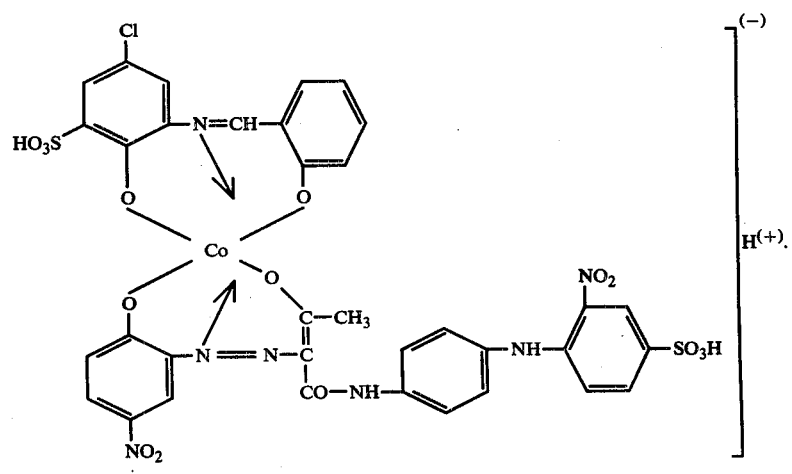
* * * * *